(12) United States Patent
Morehead et al.

(10) Patent No.: US 8,783,602 B2
(45) Date of Patent: Jul. 22, 2014

(54) SYSTEM AND METHOD FOR FURLING AN AIR CUSHION LANDING SYSTEM

(75) Inventors: John Morehead, Santa Clarita, CA (US); Malcolm Cox, Southampton (GB); Charles Eden, Cowes (GB); Robert Boyd, Santa Clarita, CA (US); Nicholas Piini, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 282 days.

(21) Appl. No.: 13/449,144

(22) Filed: Apr. 17, 2012

(65) Prior Publication Data
US 2013/0270387 A1    Oct. 17, 2013

(51) Int. Cl.
*B64B 1/00*    (2006.01)

(52) U.S. Cl.
USPC ............................. 244/30; 244/100 A; 296/98

(58) Field of Classification Search
USPC ........... 244/24, 25, 26, 27, 28, 29, 30, 100 A, 244/101, 105, 106, 107, 125, 126, 127; 296/98, 100.11, 100.13, 100.14, 296/100.15
See application file for complete search history.

(56) References Cited

U.S. PATENT DOCUMENTS

| | | | |
|---|---|---|---|
| 3,006,577 A * | 10/1961 | Schott .............................. 244/30 |
| 3,125,314 A * | 3/1964 | Smith ............................. 244/107 |
| 3,869,103 A | 3/1975 | Nelson et al. |
| 3,964,698 A | 6/1976 | Earl |
| 3,964,781 A * | 6/1976 | Fenton ..................... 296/100.13 |
| 4,004,761 A | 1/1977 | McAvoy |
| 4,019,698 A * | 4/1977 | Earl ........................... 244/110 A |
| 4,032,186 A * | 6/1977 | Pickering et al. ......... 296/100.13 |
| 5,259,574 A * | 11/1993 | Carrot ....................... 244/100 A |
| 6,880,783 B2 | 4/2005 | Munk |
| 7,040,572 B2 | 5/2006 | Munk |
| 8,016,229 B2 | 9/2011 | Greiner et al. |
| 2010/0230533 A1 | 9/2010 | Greiner |

FOREIGN PATENT DOCUMENTS

| | | |
|---|---|---|
| CA | 2557771 A1 | 2/2008 |
| GB | 2445744 A | 7/2008 |

* cited by examiner

*Primary Examiner* — Tien Dinh
*Assistant Examiner* — Michael Kreiner
(74) *Attorney, Agent, or Firm* — McDermott Will & Emery LLP

(57) ABSTRACT

A furling system adapted for use with an air cushion landing system (ACLS) coupled to a hull of an airship is disclosed. The furling system includes a deployable cover having two lateral edges. The cover is configured to cover at least a first portion of the ACLS when the cover is deployed. The furling system also includes a fairing that has an inlet and is coupled to the hull of the airship. The furling system also includes a pair of cables each coupled to at least one point along respective lateral edges of the cover. The pair of cables is configured to selectably draw the cover into the fairing through the inlet when the pair of cables is activated in a first direction, thereby stowing the cover and exposing the ACLS.

18 Claims, 9 Drawing Sheets

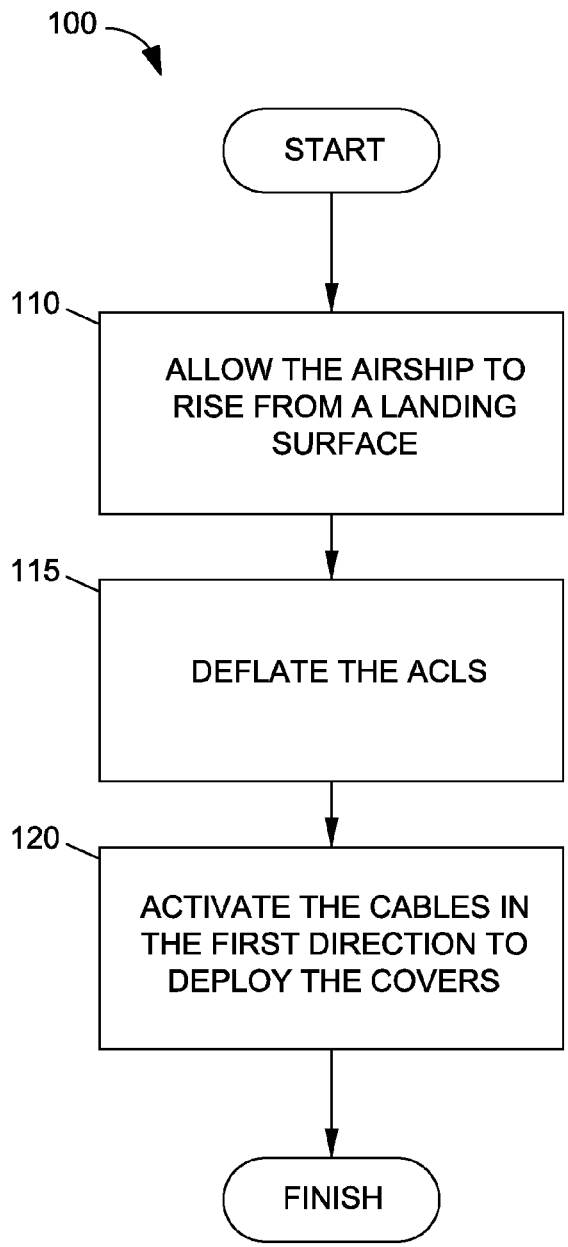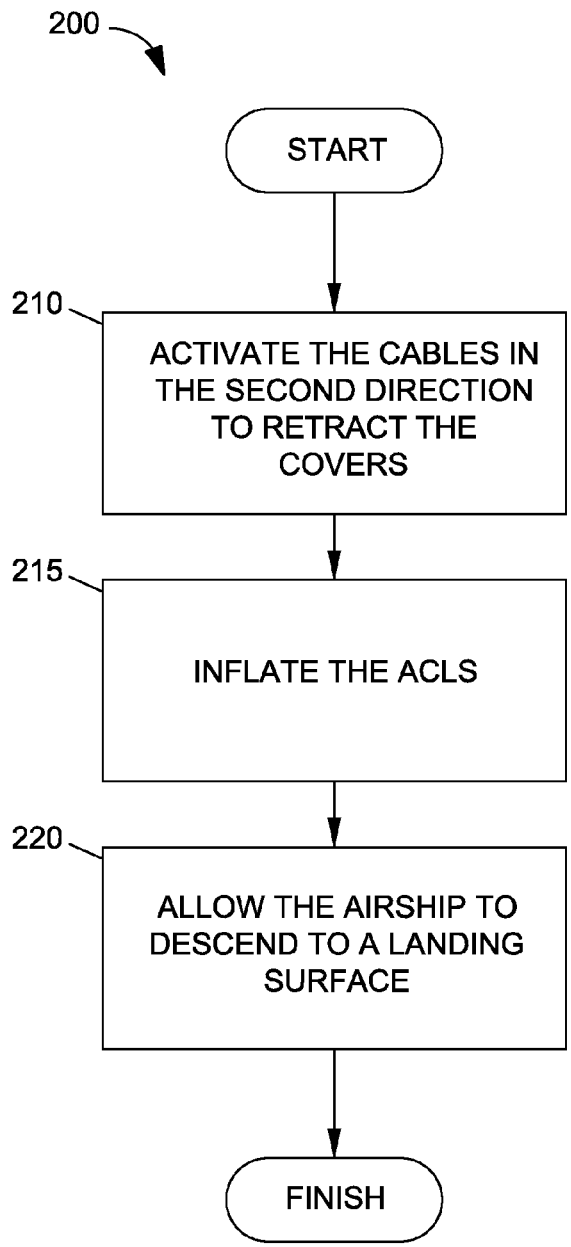
FIG. 13
FIG. 14

SYSTEM AND METHOD FOR FURLING AN AIR CUSHION LANDING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of Invention

The present invention generally relates to an airship landing system and, in particular, to a furling system configured to cover a deployable landing system while the airship is in flight.

2. Description of the Related Art

There is a renewed interest in lighter-than-air (LTA) vehicles, also referred to as airships, for uses such as cargo transport, telecommunications platforms, surveillance, emergency response, advertising platforms, and tourism, among others. Conventional LTA vehicles may be configured to dock to a tower while remaining aloft or to land on a flat open surface using wheels or skids or an air cushion landing system (ACLS), a system that includes one or more inflated pads and finger skirts to provide energy absorption during landing. Many conventional ACLSs have fixed configurations that increase the drag and reduce fuel efficiency during flight. More recently, some LTA vehicles include a dual-mode ACLS that inflates for landing and then deflates during flight. The conventional tools and techniques that enable the dual-mode ACLS system to transition between the landing mode and the flight mode are often impractical, inefficient, and prone to frequent failures.

SUMMARY

It is desirable to provide a robust and efficient system for reducing the aerodynamic drag of an ACLS while the airship is in flight.

In certain aspects, a furling system adapted for use with an ACLS coupled to a hull of an airship is disclosed. The furling system includes a deployable first cover having two lateral edges. The first cover is configured to cover at least a first portion of the ACLS when the first cover is deployed. The furling system also includes a first fairing that has a first inlet and is coupled to the hull of the airship. The furling system also includes a first pair of cables each coupled to at least one point along respective lateral edges of the first cover. The first pair of cables is configured to selectably draw the first cover into the first fairing through the first inlet when the first pair of cables is activated in a first direction, thereby stowing the first cover and exposing the ACLS.

In certain aspects, an airship is disclosed. The airship includes a hull and an ACLS coupled to the hull. The airship also includes a furling system having a first deployable cover comprising two lateral edges. The first cover is configured to cover at least a first portion of the ACLS when the first cover is deployed. The furling system also includes a first fairing coupled to the hull of the airship. The fairing has a first inlet. The furling system also includes a first pair of cables each coupled to at least one point along respective lateral edges of the first cover. The first pair of cables is configured to selectably draw the first cover into the first fairing through the first inlet when the first pair of cables is activated in a first direction, thereby stowing the first cover and exposing at least the first portion of the ACLS.

In certain aspects, a method of launching an airship is disclosed. The method includes the steps of allowing the airship to rise from a landing surface, deflating an ACLS that is coupled to a hull of the airship, and activating a furling system so as to draw a cover out of a fairing that is coupled to a hull of the airship and dispose the cover over the deflated ACLS, and draw the cover toward the hull.

In certain aspects, a method of landing an airship is disclosed. The method includes the step of activating the cables of a furling system so as to retract a cover that is disposed over an ACLS that is coupled to a hull of the airship into a fairing that is coupled to the hull. The method also includes the steps of inflating the ACLS and allowing the airship to descend to a landing surface.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 13 and 14 are flow charts of exemplary methods of launching and landing an airship according to certain aspects of the present disclosure.

DETAILED DESCRIPTION

The following description discloses embodiments of a furling system for use on an airship having an inflatable ACLS attached to the hull of the airship and configured to enable the airship to land on a flat surface, such as the ground. In certain embodiments, the airship is equipped with the furling system to cover the deflated, i.e. retracted, ACLS while the airship is in flight. The furling system includes at least one deployable cover that is configured to cover the deflated ACLS and draw the deflated ACLS up against the hull of the airship, thereby reducing the aerodynamic drag of the ACLS.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In the various figures, like components are labeled with identical element numbers for ease of understanding.

As used within this disclosure, the term "airship" refers to a vehicle intended to travel through the air while carrying a cargo comprising one or more of people, cargo, or equipment that may be carried in a gondola attached to the outside of the hull or other locations inside or attached to the hull. The airship may be "lighter than air," i.e. the airship has a net positive buoyancy in at least one configuration, or "heavier than air," i.e. the airship has a net negative buoyancy in at least one configuration. The airship may comprise engines configured to provide one or more of lift and propulsion.

As used within this disclosure, the term "hull" refers to an exterior surface of an airship. The hull may be rigid or flexible or a combination of the two, for example a rigid frame with a flexible fabric attached to the external surfaces of the frame.

As used within this disclosure, the set of terms "fore," "forward," "bow," and "front" as well as the set of terms "aft," "back," "stern," and "rear" indicate relative positions or directions on the airship with respect to the usual direction of travel, wherein the bow precedes the stern.

Figure 1:
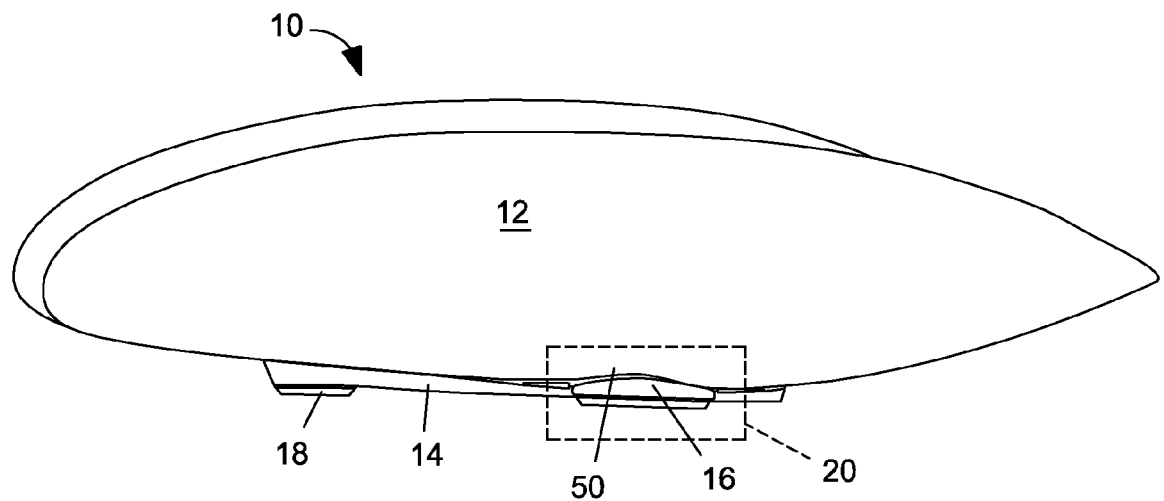
FIG. 1 depicts a side view of an airship having an exemplary drag reduction furling system according to certain aspects of the present disclosure.
Figure 2:
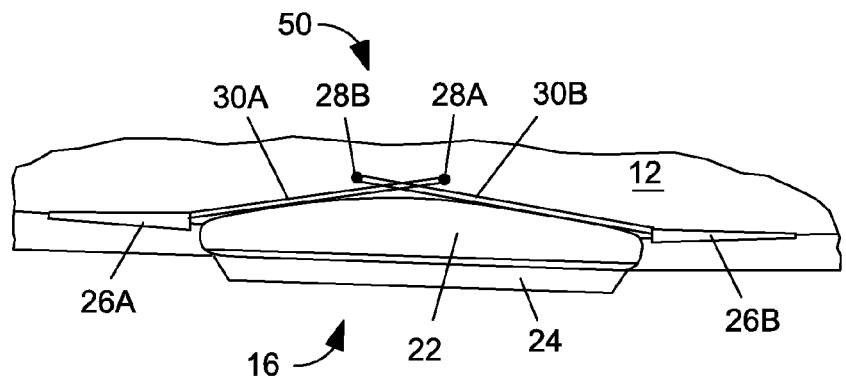
FIGS. 2 and 3 depict enlarged views of the exemplary furling system of FIG. 1 in stowed and deployed configurations, respectively, according to certain aspects of the present disclosure.
Figure 3:
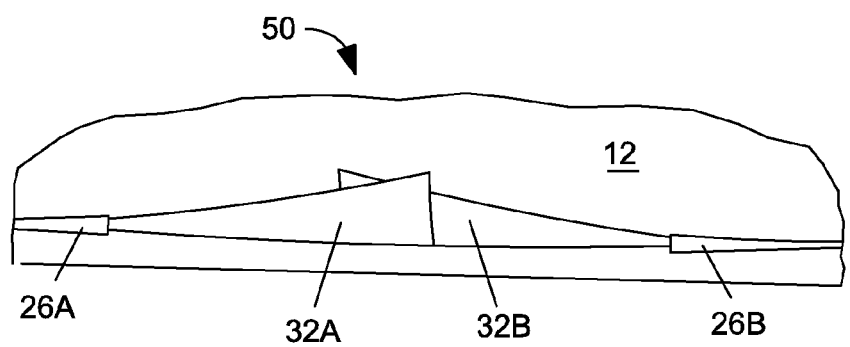

FIG. 1 depicts a side view of an airship 10 having an exemplary drag reduction furling system 50 according to certain aspects of the present disclosure. The example airship 10 has at least one hull 12 that contains one or more envelopes (not visible in FIG. 1) that are at least partially filled with an LTA gas, for example helium. In certain aspects, the airship 10 may have a plurality of hulls 12 coupled together. The airship 10 may have a gondola 14 coupled to the underside of the hull 12 and configured to carry passengers and/or cargo and one or more propulsion systems such as motor-driven propellers (not shown in FIG. 1) that may be mounted on the gondola 14 or coupled directly to the hull 12. In this example, the airship 10 of FIG. 1 comprises a forward ACLS 18 that is coupled to the gondola 14 and at least one aft ACLS 16 coupled to the underside of the hull 12. An enlarged view of the ACLS 16 and associated furling system 50 in box 20 are shown in FIGS. 2 and 3. In certain aspects, a furling system 50 is provided for the forward ACLS 18 and coupled to the gondola 14.

FIGS. 2 and 3 depict enlarged views of the exemplary furling system 50 of FIG. 1 in stowed and deployed configurations, respectively, according to certain aspects of the present disclosure. The example ACLS 16 comprises an inflatable pad 22 and an inflatable finger skirt 24. In FIG. 2, the furling system 50 is shown in a stowed configuration wherein the fore and aft fairings 26A, 26B are visible proximate to the ACLS 16 and coupled, in this example, to the hull 12. Cable pairs 30A, 30B respectively run from the interior of the fairings 26A, 26B to pulleys 28A, 28B that are coupled to the hull 12.

In FIG. 3, covers 32A, 32B have been deployed, i.e. drawn out of the respective fairings 26A, 26B, so as to cover at least a portion of the ACLS 50. The cables 30A, 30B and pulleys 28A, 28B are omitted in FIG. 3 for clarity. The covers 32A, 32B overlap in the deployed configuration shown in FIG. 3 such that the ACLS 50 is completely covered. In certain embodiments, the ACLS 50 is only partially covered. It can be seen that the covers 32A, 32B are drawn up against the hull 12 when fully deployed.

Figure 4:
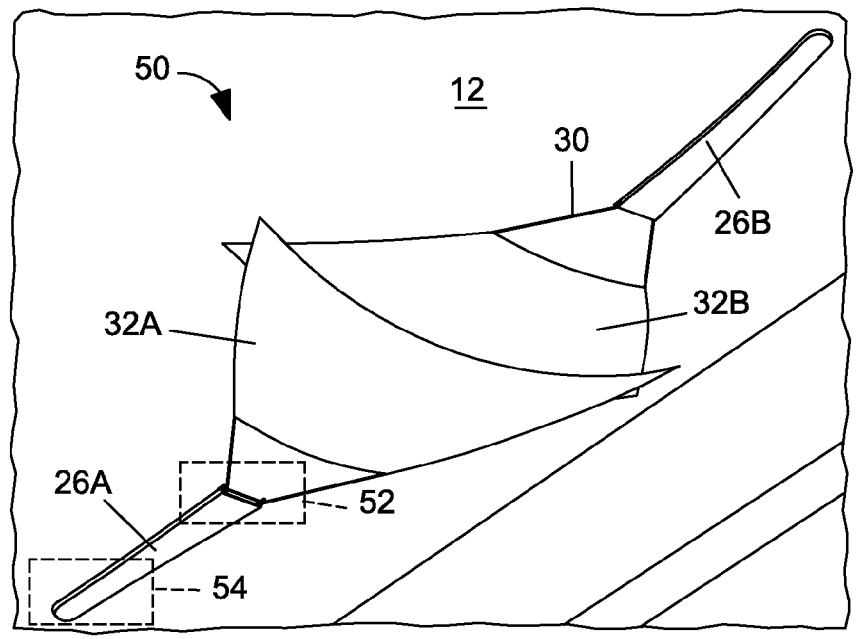
FIG. 4 is a perspective view of the furling system of FIG. 3 according to certain aspects of the present disclosure.

FIG. 4 is a perspective view of the furling system 50 of FIG. 3 according to certain aspects of the present disclosure. In this view, the forward end of the hull 12 is towards the lower left and the aft end is towards the upper right. The two covers 32A, 32B are deployed and together cover the ACLS 16 (not visible in FIG. 4). The cables 30 can be seen to run from the covers 32A, 32B to the respective fairings 26A, 26B. The configuration of the cables 30 is discussed in greater detail with respect to FIG. 7A. The portions of the furling system 50 that are indicated in the dashed line boxes 52 and 54 are shown in FIGS. 5 and 6, respectively.

Figure 5:
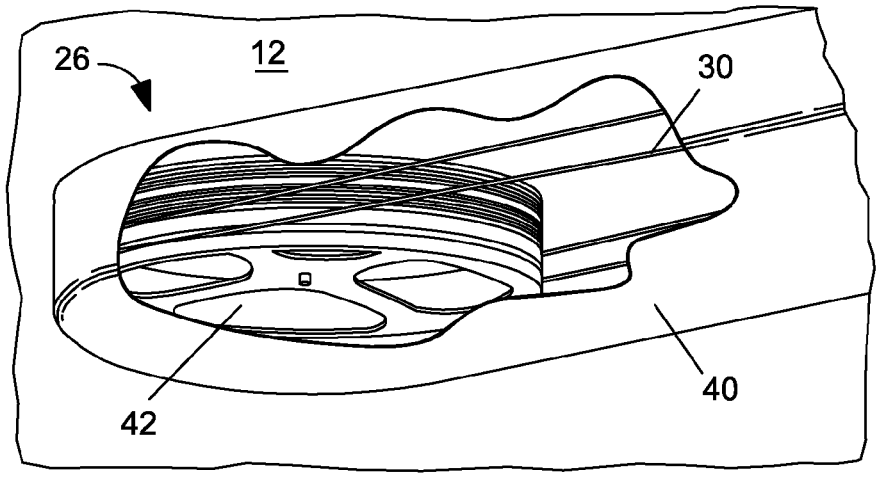
FIGS. 5 and 6 are enlarged views of portions of the furling system of FIG. 4 according to certain aspects of the present disclosure.
Figure 6:
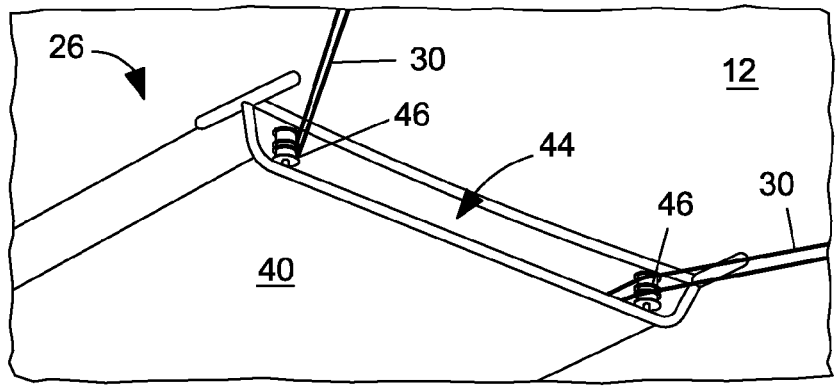

FIGS. 5 and 6 are enlarged views of portions of the furling system 50 of FIG. 4 according to certain aspects of the present disclosure. In FIG. 5, a portion of the cover 40 of a fairing 26, which is representative of both forward and aft fairings 26A, 26B, has been removed to expose the drive spool 42 and a portion of the cables 30. The spool 42 can be rotated in either direction by a drive, for example an electric motor (not visible in FIG. 5), which will activate the cables 30 to move in either a first direction or a second direction that is opposite the first direction, depending on the direction of rotation of spool 42. As both ends of each cable 30 are coupled to the spool 42, activating a cable 30 in a first direction causes one end of the cable 30 to be paid out from and then move away from the spool 42 while the other end is drawn towards and taken up on another portion of the spool 42. In certain embodiments, the spool 42 comprises a tensioning device (not shown in FIG. 5) to maintain tension in the cables 30.

FIG. 6 is a close-up of the inlet 44 at the end of fairing 26 that is towards the ACLS 16. Pulleys 46 are disposed proximate to the corners of the opening 44. It can be seen that cables 30 emerge from the fairing 26 through the opening 44, passing around a portion of the pulleys 46.

In certain embodiments, cover 40 comprises a rigid material, such as a molded plastic or formed metal. In certain embodiments, the cover 40 comprises a flexible material, such as a fabric or mesh. In certain embodiments, some or all of cover 40 is omitted, for example to save weight, as the cover 32 is retracted only when the airship 10 is on the ground, and the opening 44 is provided by a stand-alone frame (not shown in FIG. 5 or 6).

Figure 7A:
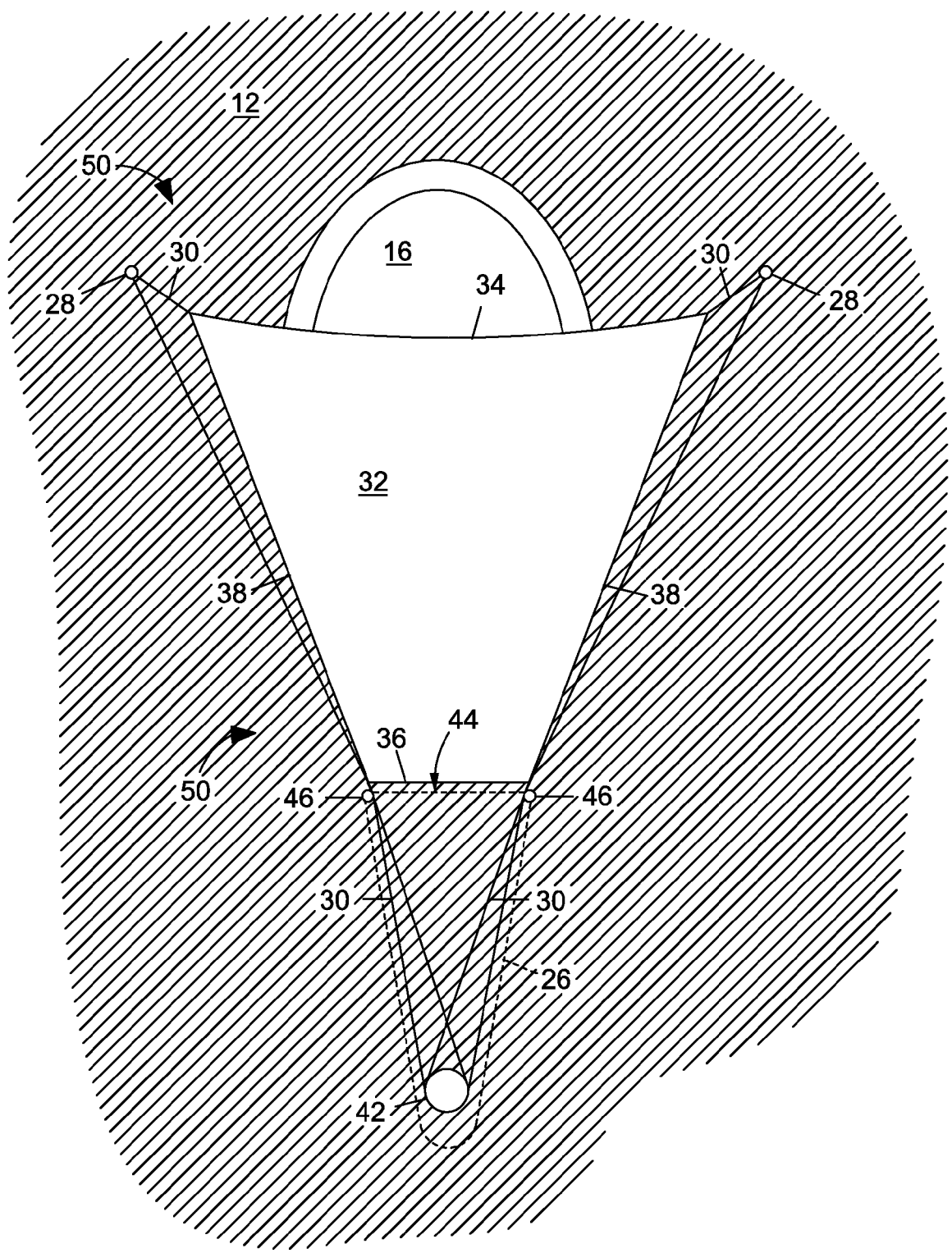
FIG. 7A is a plan view of another configuration of the furling system according to certain aspects of the present disclosure.

FIG. 7A is a plan view of another configuration of the furling system 50 according to certain aspects of the present disclosure. The furling system 50 is shown in a deployed configuration, wherein cover 32 is covering a portion of the ACLS 16 that is attached to the underside of hull 12. The cover 32 has a wide edge 34, a narrow edge 36, and lateral edges 38, with the narrow edge disposed toward the fairing 26, which is shown as a dashed-line outline so as to expose the spool 42 and cables 30. In this embodiment, the narrow edge 36 of cover 32 is proximate to the opening 44 of the fairing 26. In certain embodiments, there is a gap between the opening 44 and the narrow edge 36. In certain embodiments, the narrow edge 36 is coupled to the fairing 26 at the opening 44.

In the embodiment shown in FIG. 7A, the single cover 32 covers only a portion of the ACLS 16. In a preferred embodiment, the furling system 50 has two portions, each configured as shown in FIG. 7A, that are deployed on opposite sides of the ACLS 16 such that each cover 32, when deployed, covers a portion of the ACLS 16 with some overlap of the two covers 32, thereby covering the entire ACLS 16 as shown in FIG. 4. Both single-cover and dual-cover embodiments of a furling system are within the scope of this disclosure.

As the cover 32 is drawn out of the fairing 26, the wide edge 34 will be constrained to the width of the opening 44 by the pulleys 46, resulting in the cover hanging down a significant distance from the hull 12. This is desirable, as this depth allows the cover 32 to pass over the deflated ACLS 16 with a reduced amount of contact therebetween, thus reducing the friction load and improving the reliability of the deployment operation. As the cover 32 is further deployed, the separation angle between the cables 30 on the two sides draws the corners of the wide edge 34 apart, thereby drawing the cover up against the ACLS 16. In certain embodiments, when the cover 32 reaches the fully deployed position shown in FIG. 7A, the cover 32 is drawn up tight against the hull 12 and the ACLS 16, thereby minimizing the projection of the ACLS 16 into the airflow past the hull 12 as well as providing a smooth surface that will further reduce the aerodynamic drag of the covered ACLS 16 compared to the drag of an uncovered ACLS 16. This sequence of cover configurations is discussed in more detail with respect to FIGS. 7B-7E.

There is a cable 30 on each side of the cover 32. A first end of each cable 30 is attached to as common first portion of the spool 42. The two cables 30 run from the spool 42 past and partially around the respective pulleys 46 at the two sides of the opening 44 and then to the respective pulleys 28 that are rotatably fixed to the hull 12. Each cable 30 passes around the respective pulley 28 and returns past the respective pulley 46 to the spool 42 wherein a second end of each cable 30 is coupled to a common second portion of the spool 42 such that rotation of the spool 42 draws in one of the ends of each cable 30 while simultaneously paying out the other end of each cable 30. In certain embodiments, a portion of at least one end of each cable 30 is wrapped around the spool 42. Each cable 30 is coupled to the cover 32 at one or more points along the respective lateral edges 38. In the example of FIG. 7A, each cable 30 is coupled to the cover 32 at the near corner of the narrow edge 36, to a midpoint of the respective lateral edge 38, and to the near corner of the wide edge 34. When the spool 42 is rotated in a first direction, the cables 30 are both activated in a first direction such that the cover 32 is drawn into the respective fairing 26 through the inlet 44. When the spool 42 is rotated in a second direction opposite to the first direction, the cables 30 are both activated in a second direction that is opposite to the first direction such that the cover 32 is drawn out of the respective fairing 26 through the inlet 44.

In certain embodiments, the narrow edge 36 is attached to the opening 44 and the cables 30 attach only to the midpoint of the lateral edges and the corners of the wide edge 34. In this embodiment, when the cables 30 are activated to draw the cover 32 into the fairing 26, the midpoints are drawn past the portion of the cover 32 between the midpoints and the narrow edge 36, effectively folding the cover 32 in half In certain embodiments, the cover 32 is fully retracted when the wide edge 34 is proximate to the opening 44.

Figure 7B:
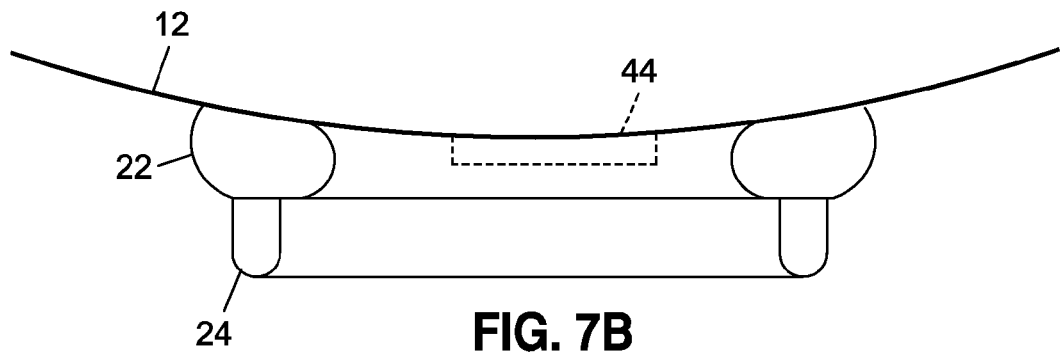
FIGS. 7B-7E are end-views of a lateral cross-section of the ACLS and furling system showing the incremental positions of the cover during deployment according to certain aspects of the present disclosure.

FIGS. 7B-7E are end-views of a lateral cross-section of the ACLS 16 and furling system 50 showing the incremental positions of the cover 32 during deployment according to certain aspects of the present disclosure. FIG. 7B depicts the inflated pad 22 and the inflated finger skirt 24 of the ACLS 16 coupled to the hull 12 with the opening 44 of the fairing 26, which is located behind the ACLS 16 in this view, shown as a dashed-line box. The furling system 50 is stowed in this view, with the cover 32 contained within the fairing 26.

Figure 7C:
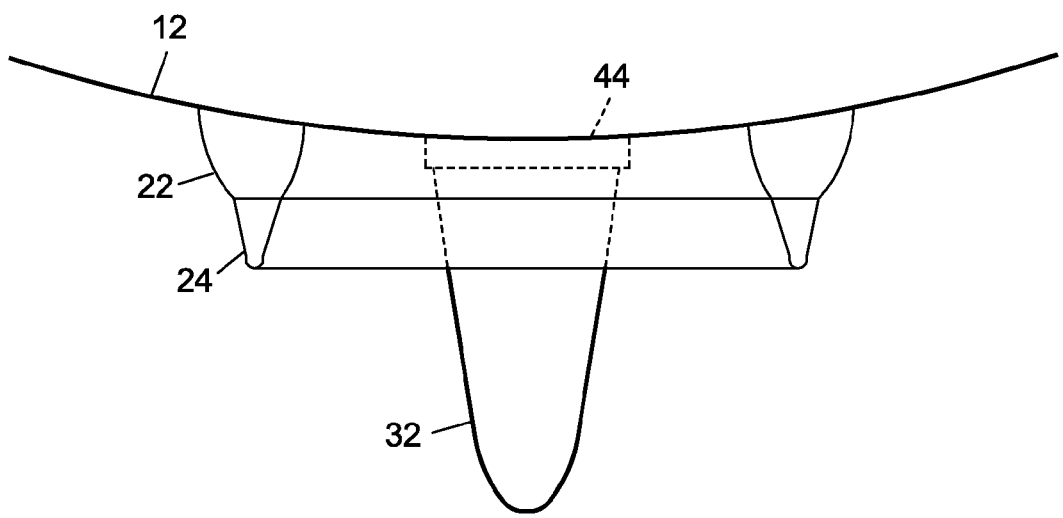

In FIG. 7C, The ACLS has been deflated and the cover 32 has been partially drawn out of the fairing 26 through opening 44. As the wide edge 34 is much longer than the width of opening 44, the cover 32 hangs down well below the now-deflated pad 22 and finger skirt 24.

Figure 7D:
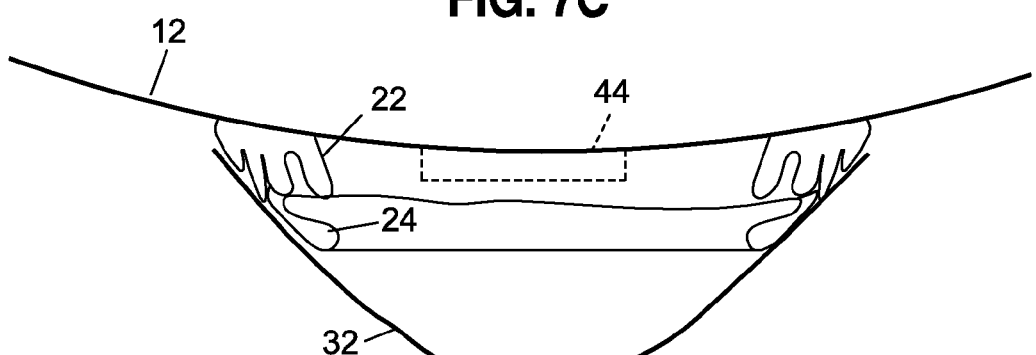

In FIG. 7D, the cover 32 has been drawn forward and, due to the angle of the cables 30, the wide end of the cover 32 has been drawn apart and tightened up toward the hull 12. It can be seen that the edges of the pad 22 and finger skirt 24 have been captured by the cover 32.

Figure 7E:
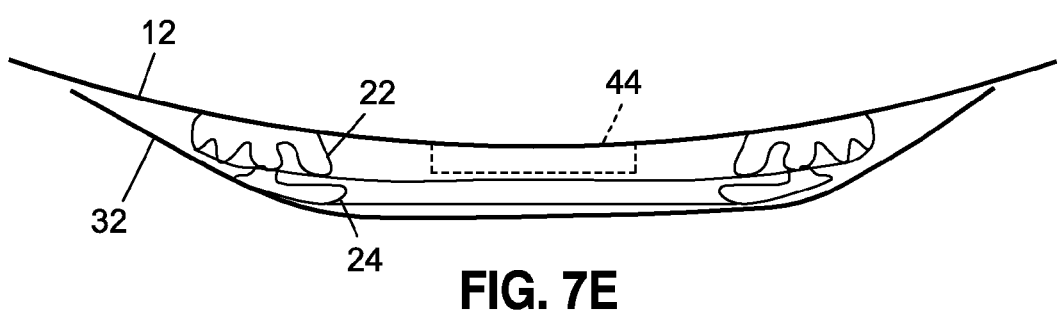

FIG. 7E depicts the fully deployed cover 32 drawn tightly up against the hull 12, thereby compressing the deflated pad 22 and finger skirt 24 against the hull 12. It can be seen the profile of the external surface of the furled ACLS, now defined by the cover 32, is smoother and less protrusive than the hanging ACLS 16 shown in FIG. 7C, which would be the configuration of the ACLS 16 while the airship 10 is in flight in the absence of a furling system 50 as disclosed herein.

Figure 7F:
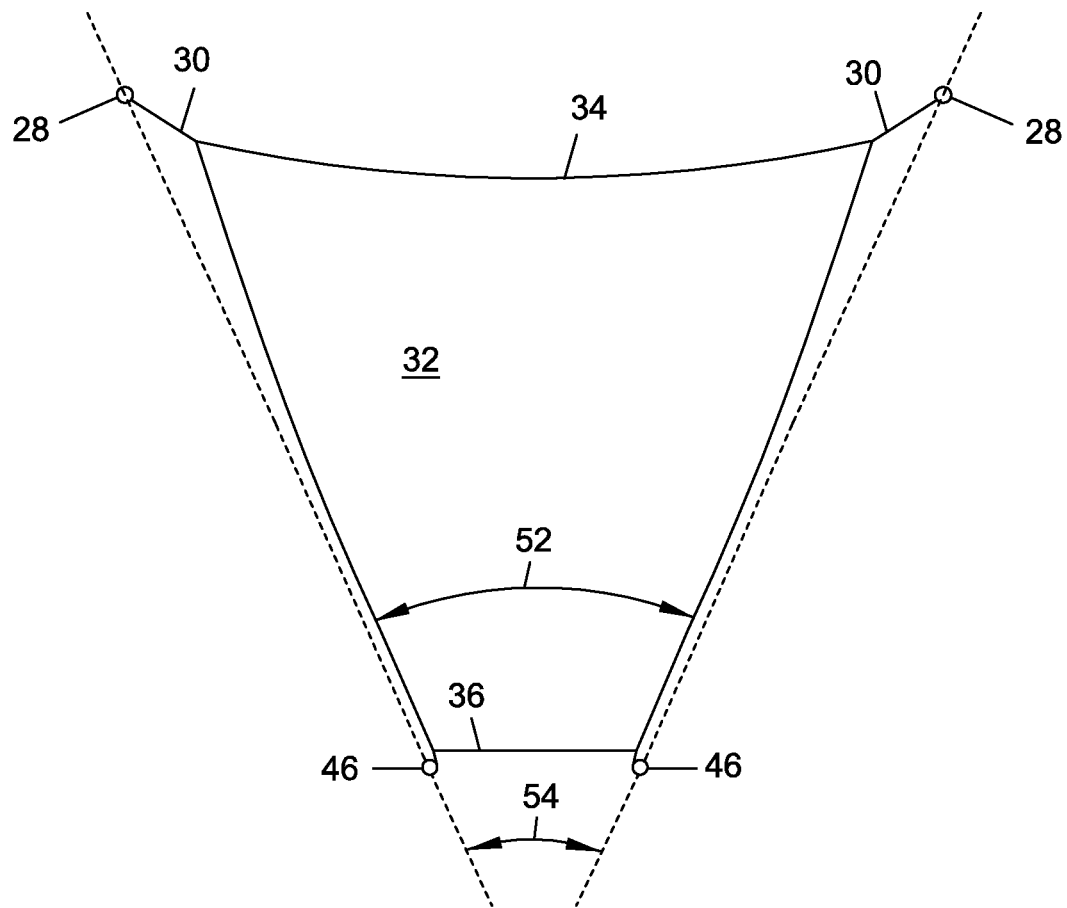
FIG. 7F is a plan view of another configuration of the furling system with construction details according to certain aspects of the present disclosure.

FIG. 7F is a plan view of another configuration of the furling system 50 with construction details according to certain aspects of the present disclosure. In certain aspects, the cover 32 has the general shape of an isosceles trapezoid with a narrow end 36 and a wide end 34 that are symmetrically arranged about a centerline 56. The sides 38 are disposed at an angle 52 that, in certain embodiments, is in the range of 45-80°. Angle 52 provides the ability of the cover 32 to drop below a hanging ACLS during deployment and retraction, as shown in FIGS. 7B-7E, while tightening up against the hull 12 when fully deployed. In certain aspects, the angle 52 is in the range of 55-70°.

The location of pulleys 46 and 28 also affect the behavior and capabilities of the cover 32 during deployment and retraction. As the cables 30 will initially draw the corners of the cover 32 along the dashed lines 58 directly from pulleys 46 to pulleys 28, the angle 54 between the lines 58 has an effect similar to that of angle 52. In certain aspects, angle 54 is in the range of 45-80°. In certain aspects, angle 54 is in the range of 55-70°. If the angle 54 is slightly larger than angle 52, the edge 34 will be stretched in the final motion of deployment of cover 32, resulting in the configuration depicted on FIG. 7F. In certain aspects, angle 54 is 1-10° greater than angle 52. In certain aspects, angle 54 is 2-5° greater than angle 52.

Figure 7G:
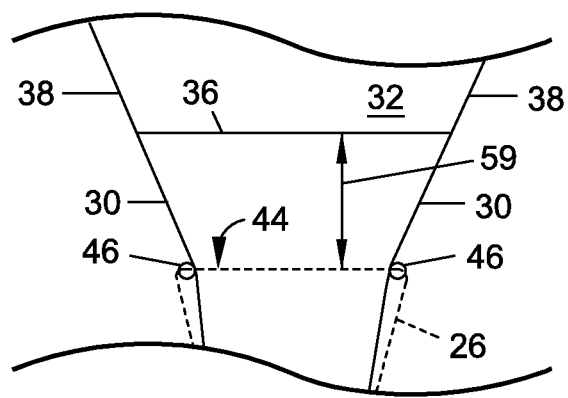
FIG. 7G depicts another embodiment of the cover according to certain aspects of the present disclosure.

FIG. 7G depicts another embodiment of the cover 32 according to certain aspects of the present disclosure. The edge 36 of cover 32 may be proximate to the opening 44 and pulleys 46, as shown in FIG. 7F, or may be spaced apart from the opening 44 by a distance 59, as shown in FIG. 7G. The corners between the edge 36 and the two sides 38 are connected to cables 30 and pulled tight when the cover 32 is fully deployed. The distance 59 is determined by the angles 52 and 54 shown in FIG. 7F and the distance between the fairing 26 and the ACLS 16. In certain aspects, the distance 59 is in the range of 0-100% of the fore-aft length of the ACLS 16. In certain aspects, the distance 59 is in the range of 5-40% of the fore-aft length of the ACLS 16.

Figure 7H:
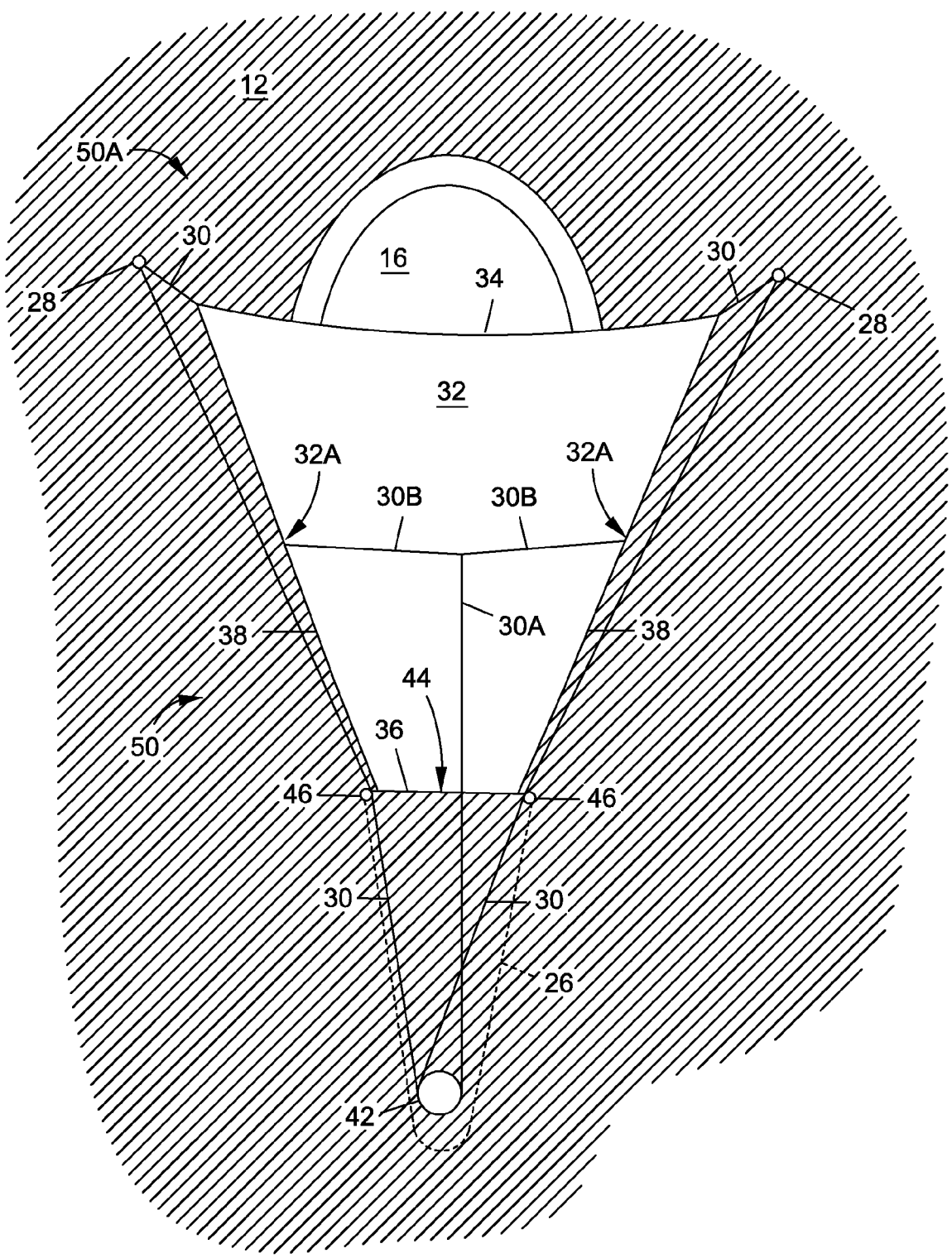
FIG. 7H depicts another embodiment of the furling system configured to fold the cover in the middle according to certain aspects of the present disclosure.

FIG. 7H depicts another embodiment of the furling system 50A configured to fold the cover 32 in the middle according to certain aspects of the present disclosure. Many features of system 50A are similar to those of system 50 as shown in FIG. 7A and are not repeated here. The example furling system 50A is configured with the narrow edge 36 attached to the opening 44 and cables 30 are attached at one end to the corners of edges 38 and the wide edge 34 and at the other end to the spool 42 on a common side. A cable 30A runs from the spool 42 up the middle of the cover 32 to a pair of lateral cables 30B that are attached to midpoints 32A of the edges 38 of cover 32. The cable 30A is attached to the spool 42 such that the cable 30A is retracted, i.e. drawn toward the spool 42, as the cables 30 are extended from the spool 42. As the cable 30*a* is retracted, the midpoints 32A are drawn past the narrow edge 36. The inclusion of the lateral cables 30B draws the midpoints 32A toward each other as the cover is retracted, thereby assisting in guiding the cover 32 into the fairing 26.

Figure 8:
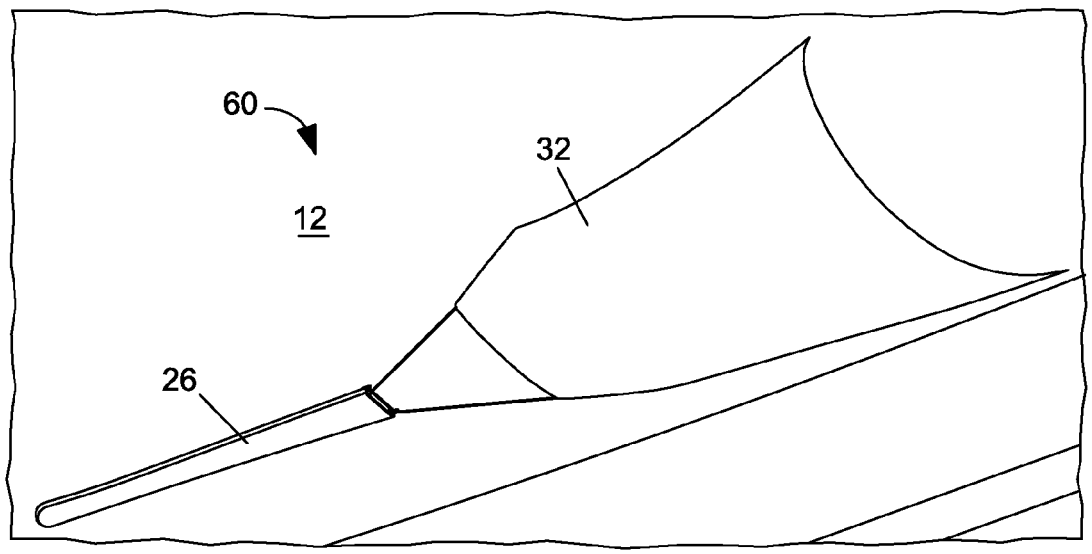
FIGS. 8 and 9 are perspective views of additional embodiments of a furling system according to certain aspects of the present disclosure.
Figure 9:
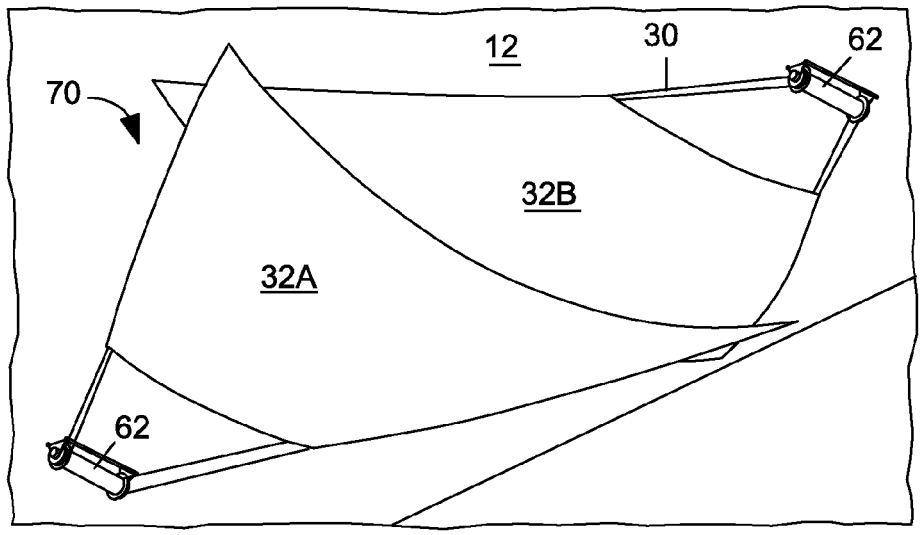

FIGS. 8 and 9 are perspective views of additional embodiments 60 and 70 of a furling system according to certain aspects of the present disclosure. FIG. 8 depicts an embodiment 60 of a furling system having a single cover 32 and a single fairing 26. The cover 32 in this embodiment is longer and has shaping to the lateral edges so as to assist in guiding the cover 32 into the fairing 26. In other aspects, this furling system 60 operates in a manner similar to that of furling system 50. In certain embodiments, the fairing 26 may be positioned either forward or aft of the ACLS 16. In certain embodiments, the fairing 26 is positioned at any orientation around the ACLS 16.

FIG. 9 depicts a furling system 70 wherein the fairings 26A, 26B and respective spools 42 have been replaced by transverse spools 62. The cables 30 are coupled to traverse spools 62 in a manner analogous to the spools 42, as is shown in more detail with respect to FIG. 10. When the covers 32A, 32B of furling system 70 are retracted, the covers 32A, 32B are wound around the traverse spools 62 themselves rather than captured within fairings.

Figure 10:
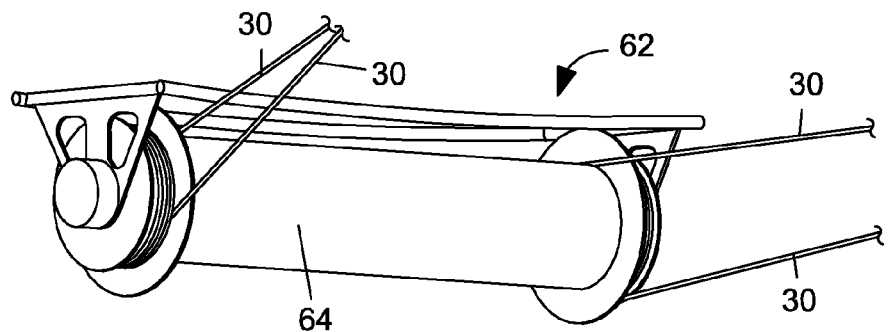
FIG. 10 is an enlarged view of the cover spool of the furling system shown in FIG. 9 according to certain aspects of the present disclosure.

FIG. 10 is an enlarged view of a traverse spool 62 of the furling system 70 shown in FIG. 9 according to certain aspects of the present disclosure. First ends of the cables 30 are attached a top side of the traverse spool 62 and follow path out to pulleys 28 (not shown in FIG. 10) then return to the bottom side of traverse spool 62, similar to the system described with respect to FIG. 7A. As the traverse spool 62 is rotated in a first direction, the cover 32 is drawn toward the traverse spool 62 and wraps around the center take-up portion 64 of the traverse spool 62.

Figure 11:
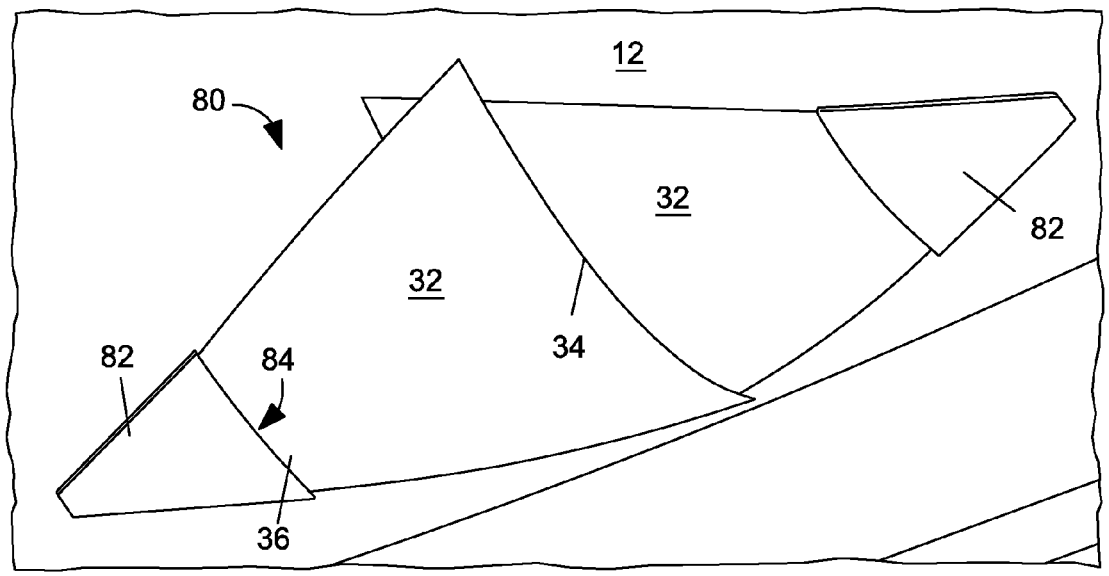
FIGS. 11 and 12 are perspective views of another embodiment of a furling system in deployed and stowed configurations, respectively, according to certain aspects of the present disclosure.
Figure 12:
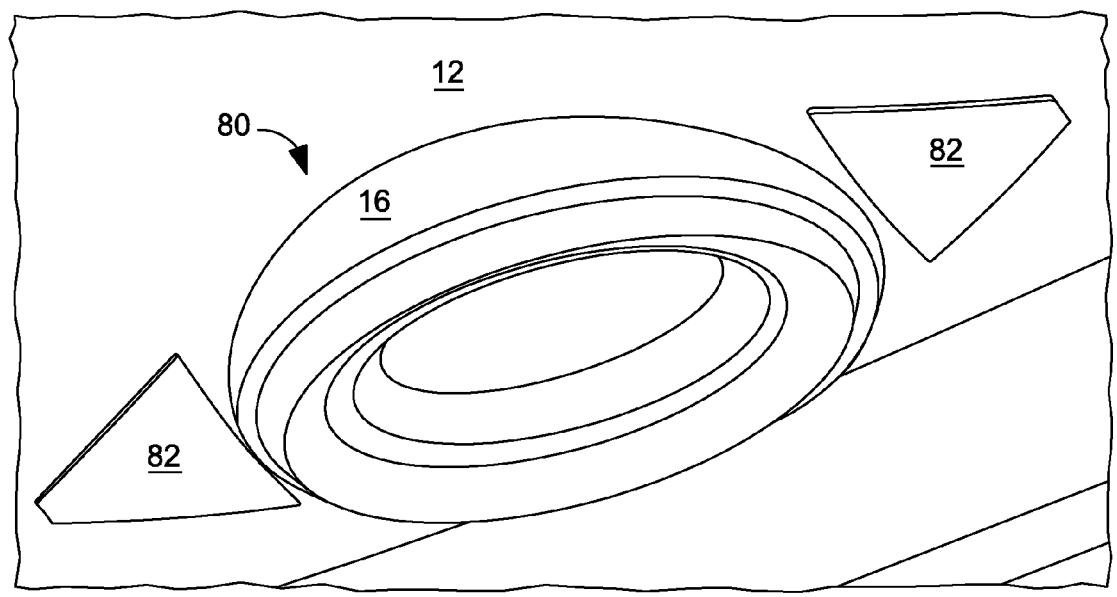

FIGS. 11 and 12 are perspective views of another embodiment 80 of a furling system in deployed and stowed configurations, respectively, according to certain aspects of the present disclosure. The fairings 82 of furling system 80 are wedge-shaped with the inlets 84 much larger, compared to the inlet 44 of the furling system 50, with respect to the narrow edges 36 of the covers 32. This wider inlet 84 facilitates the entry of cover 32 into the fairing 82, especially when the cables 30 (not shown in FIG. 11) are attached only at the midpoints and corners near the wide end 34 so as to fold the cover 32 as it is drawn into the fairing 82. FIG. 12 shows the same furling system 80 in its stowed configuration with the ACLS 16 inflated for landing.

FIGS. 13 and 14 are flow charts 100 and 200 of exemplary methods of launching and landing an airship 10 according to certain aspects of the present disclosure. FIG. 13 shows the process 100 of launching an airship 10 that starts with step 110 of allowing the airship 10 to rise from a landing surface, such as the ground. The ACLS, such as the ACLS 16 in FIG. 7A, is deflated in step 115, and the cables 30 are activated in a first direction in step 120, thereby drawing the cover 32 out of the fairing 26 through the inlet 44 and covering at least a portion of the ACLS 16.

FIG. 14 shows the process 200 of landing an airship 10 that starts with step 210 of activating the cables 30 in a second direction, opposite to the first direction, so as to draw the cover 32 into the fairing 26 through the inlet 44, thereby stowing the cover 32 and exposing the ACLS 16. The process 200 continues in step 215 wherein the ACLS 16 is inflated and the airship is allowed to descend to a landing surface, such as the ground, in step 220.

The disclosed examples of a furling system for an ACLS reduce the drag of the ACLS on the airship while in flight by reducing the protrusion of the ACLS into the airstream flowing past the hull of the airship as well as providing a smooth external surface over the ACLS. The system is robust and reliable and adds a minimum of weight to the airship. While a preferred embodiment of the disclosed furling system includes two covers disposed fore and aft of the ACLS that cooperate to completely cover the deflated ACLS while the airship is in flight, it may be advantageous, in certain situations, to provide only a single cover that covers at least a portion of the deflated ACLS.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the term "some" refers to one or more.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A furling system adapted for use with an air cushion landing system (ACLS) coupled to a hull of an airship, the furling system comprising:
   a first deployable cover comprising two lateral edges, the first cover configured to cover at least a first portion of the ACLS when the first cover is deployed;

a first fairing coupled to the hull of the airship, the fairing comprising a first inlet; and a first pair of cables each coupled to at least one point along respective lateral edges of the first cover, the first pair of cables configured to selectably draw the first cover into the first fairing through the first inlet when the first pair of cables is activated in a first direction, thereby stowing the first cover and exposing the ACLS.

2. The furling system of claim 1, wherein the first cover comprises a trapezoidal portion comprising a wide end having a first width and a narrow end having a second width that is less than the first width.

3. The furling system of claim 2, wherein the trapezoidal portion of the first cover is disposed with the narrow end toward the first fairing when the first cover is deployed.

4. The furling system of claim 3, wherein the first inlet comprises a third width that is less than the second width of the narrow end of the cover.

5. The furling system of claim 1, wherein the first cover comprises a first length and the first fairing comprises a second length that is greater than or equal to the first length, such that the entire first cover is contained by the first fairing when the first cover is drawn into the first fairing.

6. The furling system of claim 1, wherein the first pair of cables pass through the first inlet.

7. The furling system of claim 6, wherein the first pair of cables is configured to selectably draw the first cover out of the first fairing through the first inlet when the first pair of cables is activated in a second direction that is opposite the first direction, thereby covering at least the first portion of the ACLS.

8. The furling system of claim 7, further comprising a first spool coupled to the hull, wherein the first pair of cables are coupled to the first spool such that rotation of the first spool in a first direction activates the first pair of cables in the first direction and rotation of the first spool in a second direction that is opposite to the first direction of rotation activates the first pair of cables in the second direction.

9. The furling system of claim 6, wherein:
the furling system further comprises a first pair of pulleys each coupled to the hull at a point proximate to a respective corner of the wide end and one of the lateral edges of the first cover; and
each of the first pair of cables passes from the first spool through the first inlet to a respective pulley, around the pulley and back through the first inlet to the first spool.

10. The furling system of claim 1, further comprising:
a second deployable cover comprising two lateral edges, the second cover configured to cover a second portion of the ACLS when the second cover is deployed;
a second fairing coupled to the hull of the airship, the second fairing comprising a second inlet; and
a second pair of cables each coupled to at least one point along respective lateral edges of the second cover, the second pair of cables configured to selectably draw the second cover into the second fairing through the second inlet when the second pair of cables are activated in a first direction, thereby stowing the second cover and exposing the second portion of the ACLS.

11. An airship comprising:
a hull;
an air cushion landing system (ACLS) coupled to the hull; and
a furling system comprising:
a first deployable cover comprising two lateral edges, the first cover configured to cover at least a first portion of the ACLS when the first cover is deployed;
a first fairing coupled to the hull of the airship, the fairing comprising a first inlet; and
a first pair of cables each coupled to at least one point along respective lateral edges of the first cover, the first pair of cables configured to selectably draw the first cover into the first fairing through the first inlet when the first pair of cables is activated in a first direction, thereby stowing the first cover and exposing at least the first portion of the ACLS.

12. The airship of claim 11, wherein:
the airship further comprises a gondola coupled to the hull;
the ACLS of the airship is coupled to the gondola; and
the first fairing and the first pair of cables are each coupled to at least one of the gondola and the hull.

13. The airship of claim 11, further comprising:
a second deployable cover comprising two lateral edges, the second cover configured to cover a second portion of the ACLS when the second cover is deployed;
a second fairing coupled to the hull of the airship, the second fairing comprising a second inlet; and
a second pair of cables each coupled to at least one point along respective lateral edges of the second cover, the second pair of cables configured to selectably draw the second cover into the second fairing through the second inlet when the second pair of cables are activated in a first direction, thereby stowing the second cover and exposing the second portion of the ACLS.

14. The airship of claim 11, wherein the first cover comprises a trapezoidal portion comprising a wide end having a first width and a narrow end having a second width that is less than the first width.

15. The airship of claim 14, wherein the trapezoidal portion of the first cover is disposed with the narrow end toward the first fairing when the first cover is deployed.

16. The airship of claim 15, wherein the first inlet comprises a third width that is less than the second width of the narrow end of the cover.

17. The airship of claim 11, wherein the first cover comprises a first length and the first fairing comprises a second length that is greater than or equal to the first length, such that the entire first cover is contained by the first fairing when the first cover is drawn into the first fairing.

18. The airship of claim 11, wherein the first pair of cables is configured to selectably draw the first cover out of the first fairing through the first inlet when the first pair of cables is activated in a second direction that is opposite the first direction, thereby covering at least the first portion of the ACLS.

* * * * *